United States Patent
Gupta et al.

(10) Patent No.: US 11,423,089 B2
(45) Date of Patent: Aug. 23, 2022

(54) SYSTEM AND METHOD FOR DETERMINING APPLICATION PROGRAMMING INTERFACE AND OBJECT BINDINGS ON NATURAL LANGUAGE PROCESSED INPUTS

(71) Applicant: DELL PRODUCTS, LP, Round Rock, TX (US)

(72) Inventors: Chitrak Gupta, Bangalore (IN); Sushma Basavarajaiah, Bangalore (IN); Mainak Roy, Kolkata (IN)

(73) Assignee: Dell Products L.P., Round Rock, TX (US)

(*) Notice: Subject to any disclaimer, the term of this patent is extended or adjusted under 35 U.S.C. 154(b) by 231 days.

(21) Appl. No.: 16/583,081

(22) Filed: Sep. 25, 2019

(65) Prior Publication Data

US 2021/0089587 A1    Mar. 25, 2021

(51) Int. Cl.

| | |
|---|---|
| *G06F 40/295* | (2020.01) |
| *G06F 40/263* | (2020.01) |
| *G06F 40/205* | (2020.01) |
| *G06F 16/9032* | (2019.01) |
| *G10L 15/06* | (2013.01) |

(Continued)

(52) U.S. Cl.
CPC ...... *G06F 16/90332* (2019.01); *G06F 40/205* (2020.01); *G06F 40/263* (2020.01); *G06F 40/295* (2020.01); *G10L 15/005* (2013.01); *G10L 15/063* (2013.01); *G10L 15/26* (2013.01)

(58) Field of Classification Search
CPC ............... G06F 40/205; G06F 40/263; G06F 16/90332; G06F 40/295; G10L 15/005; G10L 15/063; G10L 15/26
See application file for complete search history.

(56) References Cited

U.S. PATENT DOCUMENTS

| | | | |
|---|---|---|---|
| 8,051,156 B1 * | 11/2011 | Sharma ................. | G06F 9/5094 709/223 |
| 10,839,432 B1 * | 11/2020 | Konig ................. | G06Q 30/016 |

(Continued)

FOREIGN PATENT DOCUMENTS

WO    WO-2019214798 A1 *  11/2019 ............. G06N 3/049

OTHER PUBLICATIONS

Zamanirad et al., Prgramming Bots by Synthesizing Natural Language Expressions into API INvocations, IEEE, 2017, whole document (Year: 2017).*

(Continued)

*Primary Examiner* — Sonia L Gay
(74) *Attorney, Agent, or Firm* — Larson Newman, LLP

(57) ABSTRACT

A natural language processing system includes a model trainer operable to train a natural language processing model based on a training corpus, wherein the training corpus includes a data set from one of multiple languages. An action manager curates application programming interfaces, and a processor receives a natural language query at the natural language processing system, wherein the natural language query is directed to a remote component, and the natural language query is in a language other than English. The processor determines the language of the natural language query, and binds the intent of the natural language query to an action, wherein the action is a function to be carried out by the remote component.

20 Claims, 6 Drawing Sheets

(51) Int. Cl.
    *G10L 15/26*     (2006.01)
    *G10L 15/00*     (2013.01)

(56) References Cited

U.S. PATENT DOCUMENTS

| | | | |
|---|---|---|---|
| 2011/0231423 A1* | 9/2011 | Lopiano | G06F 16/2452 707/760 |
| 2013/0332614 A1* | 12/2013 | Brunk | G06F 3/067 709/226 |
| 2014/0165002 A1 | 6/2014 | Grove | |
| 2014/0278373 A1 | 9/2014 | Grove et al. | |
| 2014/0282045 A1* | 9/2014 | Ayanam | G06F 3/0488 715/740 |
| 2019/0147883 A1* | 5/2019 | Mellenthin | G10L 15/26 704/275 |
| 2019/0213057 A1* | 7/2019 | Nitta | G06F 40/279 |
| 2019/0385611 A1* | 12/2019 | Smythe | G06N 20/00 |
| 2020/0098352 A1* | 3/2020 | Feinstein | G06N 5/022 |
| 2020/0192727 A1* | 6/2020 | Savenkov | G06F 16/367 |
| 2020/0335083 A1* | 10/2020 | Wan | G06N 3/0445 |
| 2020/0349228 A1* | 11/2020 | Bharara | G06F 40/205 |

OTHER PUBLICATIONS

"Cleo by Amazon: Alexa Skills," 2018, pp. 1-4, https://www.amazon.com/Amazon-Cleo/dp/B01N5QDE0Y.

"Sequence to Sequence Learning with Neural Networks," Ilya Sutskever et al., (Google Brain Team), ArXiv.org, Cornell University, arXiv:1409.3215 v3 [cs.CL], Dec. 14, 2014, pp. 1-9; https://arxiv.org/pdf/1409.3215.pdf.

"A Guide to NLP Implementation Using OpenNLP : Making Machines Speak," Pramod Chandrayan, Contributor, Oct. 25, 2017; pp. 1-9; https://codeburst.io/nlp-implementation-using-java-opennlp-guide-and-examples-80d86b02b5b5.

"Azure and Cognitive Services Speech to Text, Swiftly convert audio to text for natural responsiveness," Cognitive Services Speech to Text, pp. 1-4, date Mar. 2018; https://azure.microsoft.com/en-us/services/cognitive-services/speech-to-text/.

* cited by examiner

```
data = urllib.urlopen ('http://192.149.1.235/
redfish/v1/Systems/System123
health = data['status']
sys.stdout.write(health)
```

SYSTEM AND METHOD FOR DETERMINING APPLICATION PROGRAMMING INTERFACE AND OBJECT BINDINGS ON NATURAL LANGUAGE PROCESSED INPUTS

FIELD OF THE DISCLOSURE

The present disclosure generally relates to information handling systems, and more particularly system and method for determining application programming interface and object bindings on natural language processed inputs.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A natural language processing system may include a model trainer to train a natural language processing model based on a training corpus, wherein the training corpus includes a data set from one of multiple languages. An action manager curates application programming interfaces, and a processor receives a natural language query at the natural language processing system, wherein the natural language query is directed to a remote component, and the natural language query is in a language other than English. The processor may determine the language of the natural language query, and bind the intent of the natural language query to an action that is a function to be carried out by the remote component.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
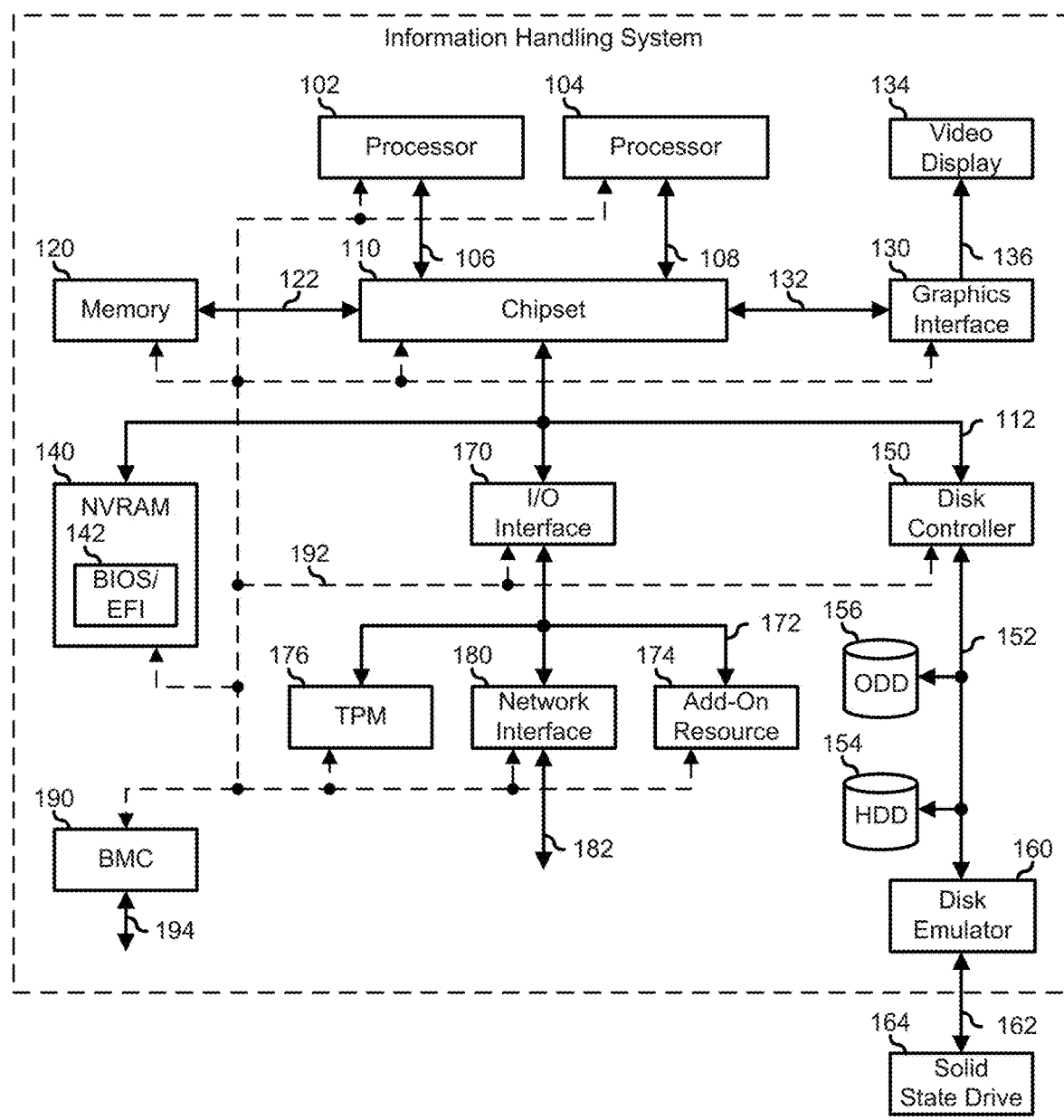
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/ video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

It is becoming increasingly common to control information handling systems via the use of natural language. A variety of information handling systems are being introduced that utilize natural language in their operation. For example, televisions, phones, lighting systems, security systems other automation systems such as the iDRAC, customer help systems, and/or natural language processing (NLP) systems allow users to provide commands via natural language (rather than defined computing languages) and then convert those commands to computing languages for execution. One specific example of home automation systems includes devices that utilize spoken natural language such as the Amazon 6 Echo from Amazon Inc. These devices operate to record spoken natural language command following the detection of an activation phrase such as Alexa for the Amazon 6 Echo and then send that recording over the internet to an NLP server system, which converts that spoken natural language command to a text natural language command and matches the entire text natural language command to an associated action. That action may be then be carried out by the NLP server system to a device for execution. In another example, a particular natural language processing system can bind a device such as the BMC or iDRAC to applications such as artificial intelligence, chatbots, conversational management, mobile artificial intelligence, etc.

Such conventional NLP systems are generally based on the English language, which does not scale to other languages and has no capability to bind a different language set. Because English is spoken by 20% of the world population, there is a need to provide an interface for the rest of the world population to interact with the NLP systems in their own language or a language of their choice. The current disclosure provides a mechanism and a model on creating a linguistic platform that integrates with the NLP system enabling the ability for users to interact with the NLP machine in a language other than English.

Figure 2:
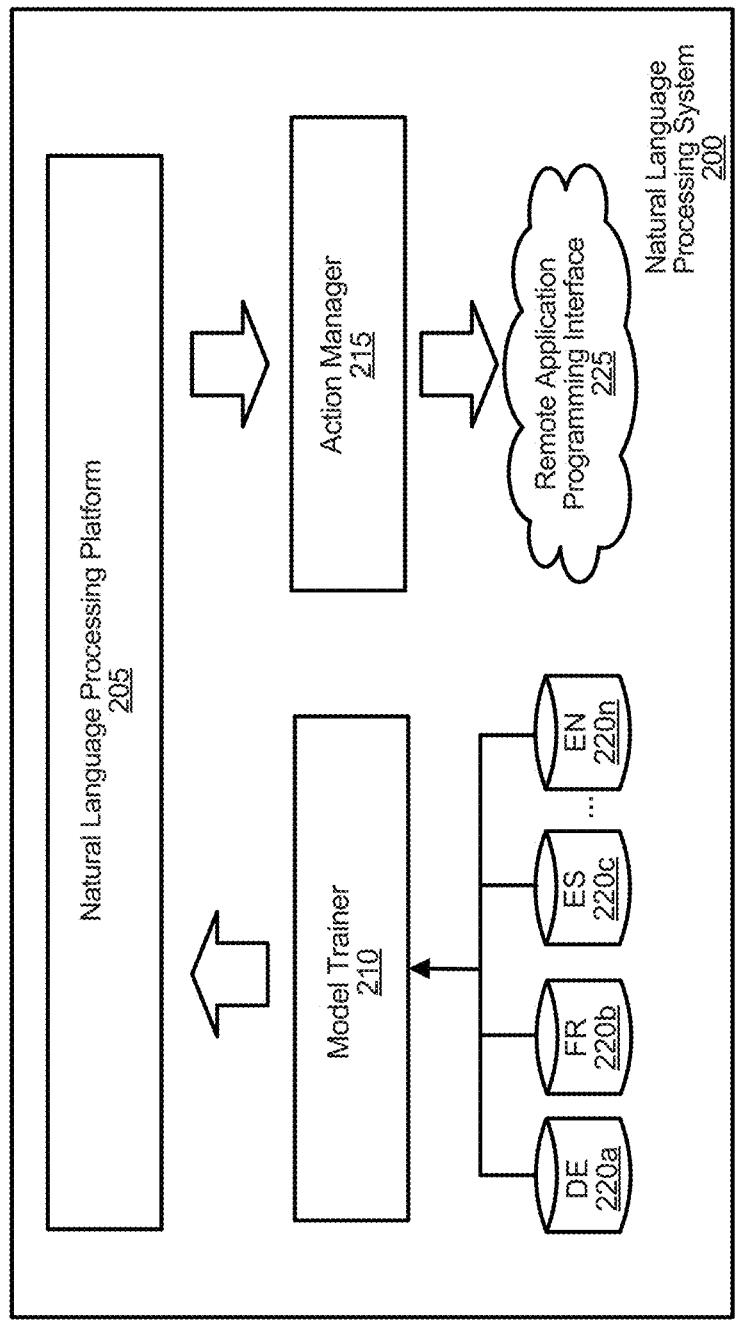
FIG. 2 is a block diagram of a natural language processing system, according to at least one embodiment of the present disclosure.

FIG. 2 shows a diagram of a multi-lingual NLP system 200 that may be provided by the information handling system 100 of FIG. 1. NLP system 200 includes an NLP platform 205, a model trainer 210, one or more training databases 220a-220n, an action manager 215, and a remote API 225. NLP system 200 may be configured to determine application programming interface and object bindings on natural language processed inputs, wherein the object bindings include the intent of the natural language processed inputs and an entity associated with the intent. NLP system 200 may be configured to communicate through a network with any number of user devices. NLP system 200 may be configured to include a speech-to-text engine configured to generate a textual transcript form the audio data. In another embodiment, NLP system 200 may provide the audio data to a third party to generate the textual transcript form of the audio data.

NLP platform 205 may be configured to process a natural language command or query also referred herein as an input query or simply a query. The query may be received from a user or generated by an information handling system. The query may be an audio or textual data. The audio data may be received from a voice-activated assistant device. The textual data may be received from a text input device such as a keyboard. The textual data may be a transcription of the audio data.

NLP platform 205 may be configured to analyze the query to determine intent of the user and an action corresponding to the intent. Analysis of the query may include language detection, tokenization, sentence segmentation, part of speech tagging, named entity recognition, named entity extraction, chunking, parsing, and coreference resolution. Named entity recognition is used to locate and classify named entity in unstructured text into pre-defined categories such as person names, organization, locations, etc. NLP platform 205 may include at least one component to perform one or more of the functions supported above. For example, NLP platform 205 may include a sentence detector, a tokenizer, a document categorizer, a part-of-speech tagger, a named entity recognizer, a named entity extractor, etc. NLP platform 205 may include OpenNLP, natural language toolkit (NLTK), Stanford CoreNLP, etc.

Model trainer 210 may be configured to train an NLP model using one or more training corpus to learn the information and structure in the training corpus. A trained NLP model may then use the learned information and structure to label an unseen text. The NLP model may be a Hidden Markov Model (HMM), a MaxEnt Markov Model (MEMM), or a Conditional Random Fields (CRF) model. Model trainer 210 may train the NLP model using a known NLP model training method such as a Maxent algorithm, a Perception algorithm or a Naïve Bayes algorithm.

Each one of training databases 220a-220n includes a training corpus for a particular language. As shown, training database 220a includes a Deutsche training corpus, training database 220b includes a French training corpus, training database 220c includes a Spanish training corpus, and training database 220n includes an English training corpus. Each one of training databases 220a-220n may be a relational database, a data warehouse, a distributed database, or any other database known in the art. Training databases 220a-220n may be coupled to NLP platform 205 through a network that may include a network interface controller, a wireless communication subsystem such as Bluetooth® communication subsystem, a near field communication (NFC) subsystem, and a WiFi communication subsystem, or any other communication component that would be apparent to one of skill in the art.

Action manager 215 may be configured to provide a binding or mapping between actions or actual tasks to be initiated at a particular device and an intent of the query. An action may be a function or requests to be executed at a remote component. The request may be transmitted via an interface such as remote API 225. An API may be a set of routines, protocols, and/or tools that specifies how software components interacts which may adhere to standards such as hypertext transfer protocol (HTTP), representational state transfer (REST) style, and simple object access protocol (SOAP).

Figure 3:
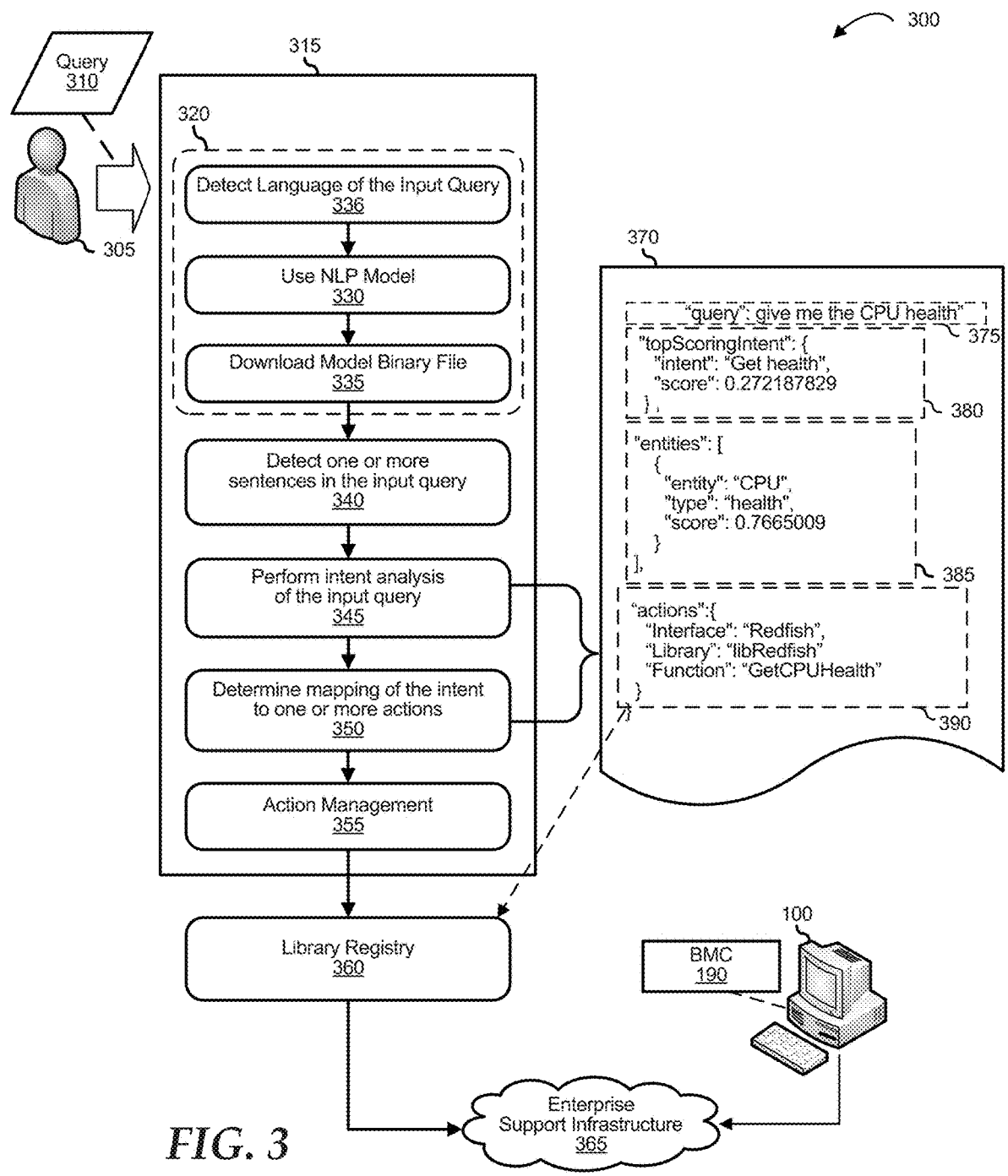
FIG. 3 is a block diagram of a system for determining application programming interface and object bindings on natural language processed inputs, according to at least one embodiment of the present disclosure.

FIG. 3 shows a diagram of a natural language processing system 300 for determining application programming interface and object bindings on natural language processed inputs. Natural language processing system 300 shows a more detailed diagram of a part of natural language processing system 200. Natural language processing system 300 includes a user 305, a query 310, a workflow 315, a result 370, an enterprise support infrastructure 365, and information handling system 100. Workflow 315 is a sequence of processes through which a natural language query such as a query 310 passes from initiation to completion. Workflow 315 may be performed by one or more components of FIG. 1 and FIG. 2. Each block in the workflow 315 may be performed by a different component or combination of components. For example, block 320 may be performed by NLP platform 205 while block 355 may be performed by action manager 215.

Prior to block 320, user 305 may use a user device configured to transmit natural language commands or requests such as query 310 to a multi-lingual NLP system such as NLP system 300. The user device may also be configured to receive responses from NLP system 300. The requests and responses between the user device and NLP system 300 may be transmitted using known communication protocols. In certain situations, NLP system 300 does not know the language used in the query. For example, because information handling system 100 may be located in any one country in the world, NLP system 300 may receive a query in a language other than English.

Because NLP system 300 generally does not know the language used for the query, workflow 315 typically starts at block 320 to determine or detect the language of query 310 from user 305. As shown, block 320 includes blocks 325, 330, and 335. One or more components of NLP system 200 such as a language detector may be used to perform block 320. Query 310 may include digital audio and/or text data and may include one or more utterances. An utterance may be an audio utterance, a text utterance, or a combination of both. The audio utterance corresponds to a unit of speech that includes a word, a clause, or one or more sentences. A text utterance corresponds to a unit of speech in a textual form which may be a word, a clause, or one or more sentences. In determining the language of query 310, workflow 315 proceeds to block 330 and identifies an existing NLP model such as a language detector model. After identifying the NLP model, the method may download a model binary file associated with the identified NLP model at block 335. The model binary file may be an existing pre-trained NLP model associated with the identified NLP model. If there is no pre-trained NLP model, the language detector may train the NLP model. The model binary file may be used in blocks 340, 345, 350, and 355 of workflow 315.

The method may use the training corpus stored in one or more of training databases 220a-220n such as from a set of sample texts to determine the language of query 310. The set of sample texts may include one sentence per supported language of NLP system 200. For example, the set of sample language texts may include a sentence in Deutsch, a sentence in French, a sentence in Spanish, a sentence in English, etc. NLP platform 205 may return a data structure such as a list or an array of probable languages with a probability score for each language. The probability score is a degree of confidence that the query is of a particular language. For example, NLP platform 205 may return that query 310 is 90% English or 15% Scots. NLP platform 205 may select a top-scoring language or the language with the highest probability score.

After detecting the language of the query, the workflow proceeds to block 340. At block 340, the workflow determines or detects one or more sentences in query 310 based on the top-scoring language. The sentence detection may be performed by a component of NLP platform 205 such as a sentence detector. The sentence detector along with a tokenizer may have been trained on each of the supported languages of NLP system 200 including the top-scoring language in block 320. The sentence may use various mechanisms and/or algorithms such as tokenization in detecting the sentences, regular expressions, and a set of rules. Tokenization is the process of breaking up a text into units called tokens. The tokens include words, numbers, punctuation marks, and/or boundaries. The boundaries may be used to detect boundaries between words or sentences.

The boundaries between sentences may include as a period for written text, or a pause longer than a specified threshold for spoken text. Based on the analysis, block 340 may return an output that includes a data structure such as a list or an array of one or more sentences. The data structure may also include a probability score for each sentence such as the following: number of sentences: 1, score: 0.9125, sentence: "give me the CPU health"; number of sentences: 2, score: 0.562, sentence: "give me", "the CPU health". NLP platform 205 may select the top-scoring sentence, that is the sentence with the highest probability score. After detecting the top-scoring sentence(s), the workflow proceeds to block 345.

At block 345, the workflow determines a user intent or simply intent of query 310. As used herein, the intent may be the objective of the user that is conveyed in the query and may not be the exact words used in the query. A key part in analyzing query 310 is the understanding the intention of user 305 and extracting relevant information associated with that intention. Determining the intent of query 310 may include assigning a part-of-speech tag to each token of the top-scoring detected sentence(s). Part-of-speech-tagging is the process of marking up a word in a text as corresponding to a particular part of speech. A part-of-speech tagger model may have been trained prior to analyzing each of the top-scoring sentences. The part-of-speech tagger may be configured to determine an appropriate tag for each token based on a particular linguistic pattern. For example, each token may be marked either as a noun, a verb, an adjective, an adverb, etc. based on the language of the query and the position of the token in the sentence.

The NLP platform may use various algorithms such as neural vector space model (NVSM), maximum entropy with n-gram features, and neural networks for sentence classification to determine the intent. In determining the intent the algorithm may output one or more candidate intents. Each candidate intent may include an intent probability score. As used herein, the intent probability score indicates the degree of confidence that the candidate intent is the intent of user 305. NLP platform 205 may select the top-scoring candidate intent as the user intent as shown in section 375 of result 370. Determining the intent may also be based on analyzing the tokens of the top-scoring sentence(s) that were tagged as verbs. The intent may also be based on the location of the token tagged as verb within the sentence and the relation of the token with other tokens in the sentence.

In addition to determining the intent, the NLP platform 205 may determine entities or information relevant to the top-scoring intent. As used herein, an entity may refer to an object or an attribute associated with the intent and may fall into two categories: proper nouns or common nouns. For example, if the intent of the user is to retrieve information from a particular component or device, then the entity pertains to the part of the component to retrieve the information from.

In determining the entities relevant to the intent, the NLP platform may use a linguistic grammar-based technique such as analyzing tokens tagged as nouns or pronouns. The NLP platform may use other techniques in determining the entities such as statistical models or classification. The NLP platform may return an output that includes a data structure such as a list or an array of candidate entities. Each candidate entity may include an entity type and an entity probability score. As used herein, the entity type may refer to an attribute associated with the entity. For example, if the entity pertains to the part of the component to retrieve the information, then the type pertains to the kind of information to be retrieved. The entity probability score refers to the likelihood that the candidate entity is the subject of the intent.

Determining the entity type may be based the proximity of a particular token to the candidate entity and whether the particular token is included in a list of probable entity types. The NLP platform may select a top-scoring candidate entity among the candidate entities. The top-scoring entity may also be based on whether the top-scoring entity is included in a list of probable entities. As shown in section 385 of result 370, the top-scoring entity for the intent shown in section 380 is "CPU" with the entity type "health." The workflow proceeds to block 350.

At block 350, the workflow maps the intent to one or more actions that are mapped to the top-scoring intent also known as intent to action binding. The intent to action binding is the process that establishes a connection between the intent to one or more actions. Basically, the NLP platform determines one or more actions that may be performed based on the intent and its associated entities. As used herein, an action may include functions of a library in a particular interface, wherein the function may be a command to be performed at a component.

The NLP platform may use a similarity metric to determine which API from the training corpus is related to the intent and/or its associated entities. The NLP system may output a data structure such as a list or an array of possible intents and their corresponding candidate actions. The NLP platform may tokenize the API or functions in the training corpus in determining the candidate actions associated with the intent. For example, the API function "GetCPUHealth" may be tokenized to "Get", "CPU", and "Health" and the intent "Get health" may be tokenized to "Get" and "health". Further, the entity associated with the intent may also be tokenized such as "CPU" to "CPU." Determining a match between the different tokens includes determining whether one or more tokens of the intent and the entity matches with one or more tokens of the API function. For example, as shown in section 390, the NLP platform determined that to perform the intent "Get health" of the "CPU", a function call of "GetCPUHealth" of the interface Redfishlocated at library "libRedfish" may be used.

Result 370 shows an exemplary result of a portion of an output of workflow 315. Result 370 may be an output of blocks 345 and 350 in particular. Result 370 is shown in a JavaScript object notation (JSON) data format. In another embodiment, result 370 may be in a different data format such as an extensible markup language (XML) data format, a comma-separated values (CSV) data format, etc. As shown, result 370 includes different sections such as section 375 that includes query 310, section 380 that includes the top scoring intent, section 385 that includes an entity associated with the top-scoring intent, and section 390 that includes an action associated with the top-scoring intent. After determining the intent to action binding, the workflow proceeds to block 355.

At block 355, the workflow based on section 390 determines an API associated with the function from a library registry 360. The NLP system may be configured to curate the APIs according to an interface such as WSMan, Dell RACADM, or Redfish. WSMan is a SOAP-based protocol management transport protocol that enables a user to access systems management data objects and methods supported by the target platform. RACADM command-line utility (CLI) provides a scriptable interface to perform inventory, configuration, update, and health status checks of information handling systems. Redfish is an open industry standard RESTful interface and utilizes JSON and OData data format designed to deliver simple and secure management of scalable platform hardware. Library registry 360 is a central registry and library that hosts a collection of the curated APIs from different interfaces. Each interface may have one or more libraries. Each library may include one or more functions or APIs.

The function may be performed on a component such as BMC 190 of information handling system 100 via enterprise support infrastructure 365. Components, as used herein, are not limited to physical components such as hardware components and/or devices but also includes software or service components. Enterprise support infrastructure 365 provides the services to communicate with a remote endpoint such as BMC 190. Other endpoints may include BIOS, a chassis, a PCI device, etc. Enterprise support infrastructure 365 may be a web service to process and transmit the API request and returns a response received from the remote endpoint to the user.

Figure 4:
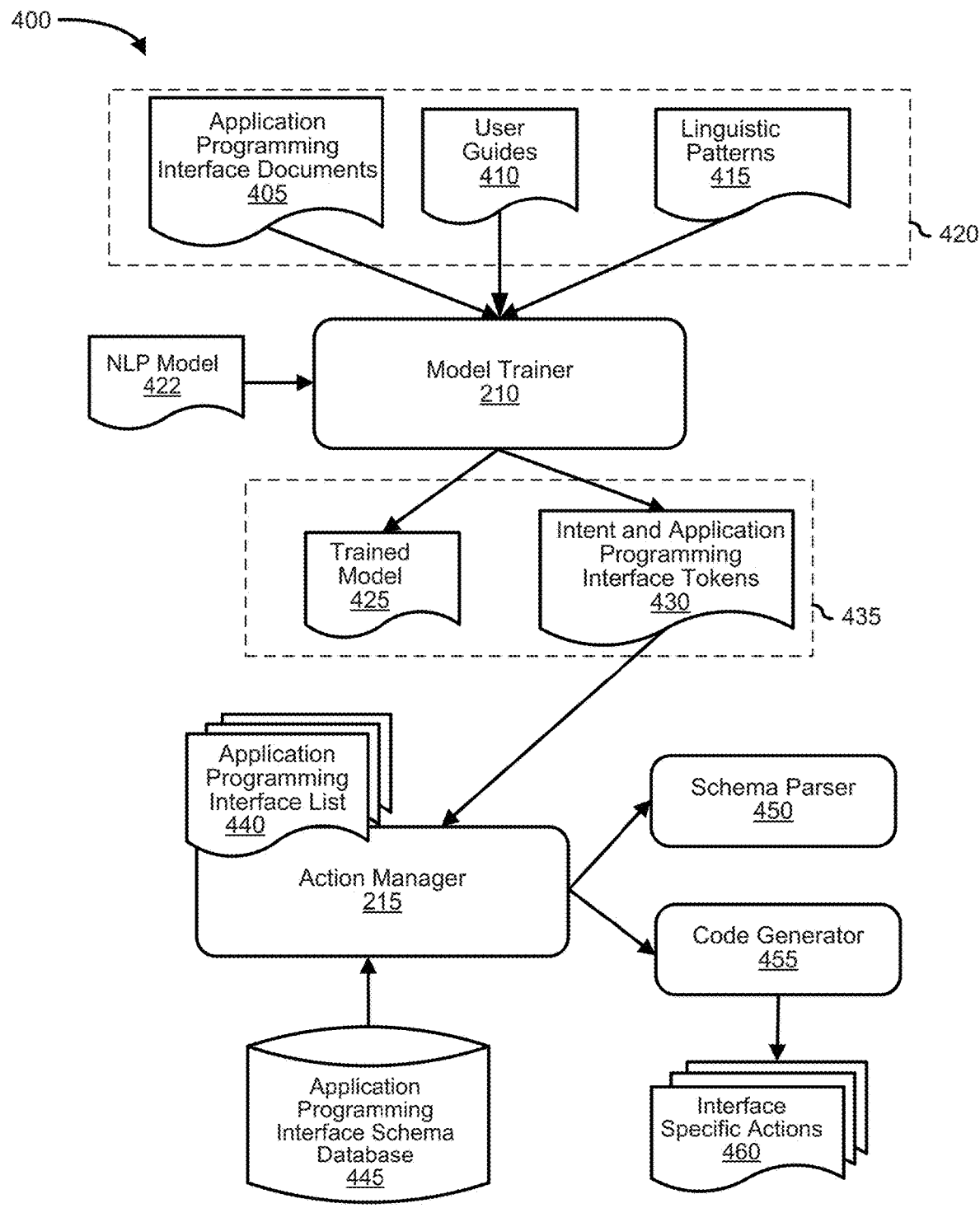
FIG. 4 is a block diagram of a section of the natural language processing system in greater detail, according to at least one embodiment of the present disclosure.

FIG. 4 shows a natural language processing system 400 in more detail. Natural language processing system 400 includes model trainer 210, action manager 215, a schema parser 450, a code generator 455, and an API schema database 445. Model trainer 210 may be configured to train an NLP model 422 and to generate an output 435 that includes a trained model 425 and an intent and API tokens 430. API tokens 430 may include tokens based on API documents 405.

Model trainer 210 may use training corpus 420 in the training of NLP model 422 to understand the language, the grammar, and the terminologies of queries. Training corpus 420 is a collection of text from different information data files like API documents 405, user guides 410, and linguistic patterns 415 and may be formatted according to requirements of model trainer 210. Linguistic patterns 415 include are language-specific linguistic information such as grammar, lexical, and semantic relationships. Each training corpus may be for a particular language; as such NLP system 400 may include training corpora of several languages.

Action manager 215 may be configured to manage the bindings between each intent and action. The intent to action binding may be maintained for each language supported by the NLP system. After determining the action or actions, action manager 215 determines a corresponding API for each action. Action manager 215 may use API tokens 430 and an API list 440 to determine one or more APIs corresponding to the action. Action manager 215 may use the interface, the library, and the function in each action to determine the corresponding API from the library registry.

After determining the API, action manager 215 retrieves a schema associated with the API from a schema database such as API schema database 445. Schemas define the organization of data in partition of a layer, both the structure of data and its content. The schemas may be organized in the API schema database 445 according to the interface and library. After retrieving the schema, action manager 215 transmits the schema to a schema parser such as schema parser 450.

Schema parser 450 may parse and validate the schema according to its data format. For example, a Redfish API schema may be in a JSON data format or common schema definition language (CSDL) data format, while WSMan schema may be in an XML data format or web services description language (WSDL) data format. Schema parser 450 may transform the retrieved JSON schema into a data structure of JSON elements for further processing such as to represent a field or a parameter in the schema. Similarly, in another example, schema parser 450 may transform the retrieved XML schema into a list of XML elements for further processing. The data structure may include the relationships and attributes of the elements which may be used in generating code.

Action manager 215 may then transmit the list of elements to code generator 455 which generates code such as interface specific actions 460 based on the schema. Code generator 455 may put together the elements to generate one or more scripts or API requests to be transmitted to an endpoint via enterprise support infrastructure 365 of FIG. 3. The script generated may be based on a scripting language known in the art such as python, JavaScript, etc. The API request may include an internet protocol address of the component or application associated with the component. The API request may be a RESTful API request, a SOAP request or any other API request format known in the art. The generated script may include values for the parameters required for an API request.

Figure 5:
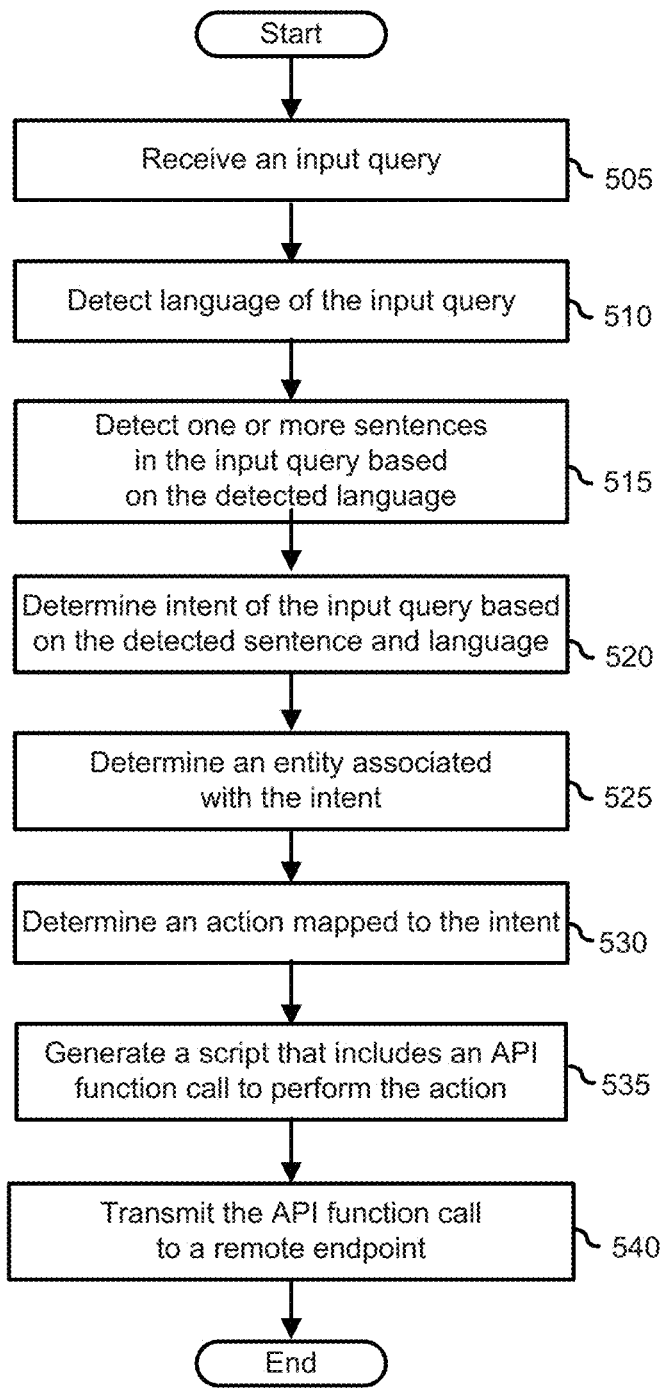
FIG. 5 is a flowchart illustrating a method for determining application programming interface and object bindings on natural language processed inputs, according to at least one embodiment of the present disclosure.

FIG. 5 shows a flowchart of a method 500 for determining application programming interface and object bindings on natural language processed inputs. The method 500 may be performed by one or more components of FIG. 2. The method typically starts at block 505, where the method receives a natural language command such as a query as shown in section 615 of FIG. 6. In an embodiment, at block 505, the NLP system 200 may receive a natural language command in a various manners. For example, the NLP system 200 may utilize a microphone subsystem to record a spoken natural language command, such as might be spoken by a user in response to, for example, detecting an activation command.

In some embodiments the NLP system 200 may operate to convert the recorded spoken natural language command to a text natural language command using a variety of audio-to-text conversion subsystems known in the art. In another example, the NLP system 200 may receive a recorded spoken natural language command from a conventional voice-activated assistant device and may operate to convert the recorded spoken natural language command to a text natural language command using a variety of audio-to-text conversion subsystems known in the art. After receiving the query, the method proceeds to block 510.

At block 510, the method determines the language of the query. The method may determine the language of the query based on a set of training corpus of the supported languages of the NLP system. The NLP system may return a set of candidate languages. Each candidate language may include a probability or likelihood that the detected language is the language of the query. For example, NLP platform 205 may return that the query of section 615 is 90% Spanish or 15% Portuguese. After detecting the language of the query, the NLP system may download a trained model binary file corresponding to the detected language. The method proceeds to block 515.

At block 515, the method may use the trained model to detect one or more sentences in the query based on the detected language. A component of the NLP system such as a sentence detector may be used to perform block 515. In one embodiment, the method may use a set of rules to determine sentences before tokenization. For example, except for the first and last sentence, the first non-whitespace character is assumed to be the begin of a sentence, and the last non-whitespace character is assumed to be a sentence end. In another embodiment, the method may detect the one or more sentences after tokenization of the query. For example, the method can detect whether a token is a punctuation character that marks the end of sentence or not. After detecting the one or more sentence in the query, the method proceeds to block 520.

At block 520, the method determines the intent of the query. A component of the NLP system 200 such as an intent analyzer may be used to perform block 520. The method may determine the intent based on the tokens, the one or more determined sentences, and/or the determined language of the query. The intent may be referred to as the objective that the user intends to achieve through the query. In one embodiment, the method may use a set of rules based on the training corpus or a subset thereof to determine the intent of the user. The training corpus may be based on the determined language of the query and may include a list of possible intents. The list of possible intents may be based on a dictionary of synonyms of words associated with each possible intent. For example, as shown in section 620 of FIG. 6, the top-scoring intent is "Obtener el estado", wherein obtener may be one of the possible intents in the list and a synonym of a verb or action "comprobar" in the query as shown in section 615.

If the query has been tokenized, the method may analyze the tokens in the order that they appear in the query. Otherwise, the method may tokenize the query as part of the analysis. Analysis of each of the words/tokens in the query in parallel will fall within the scope of the current disclosure. The method may analyze the words/tokens in the query until an action word is identified. With reference to an example query in section 615, the natural language processing platform may analyze the query "Quiero comprobar el estado del servidor" to identify an action element for an endpoint. In this example, the method may determine that "[q]uiero", "el", and "del" are noise words and thus may be skipped while the word "comprobar" may denote an action. After determining the intent of the query, the method may proceed to block 525.

At block 525, the method determines an entity associated with the intent. A component of the NLP system 200 such as a named entity recognizer may be used to perform block 525. At block 525, the method may determine one or more entities based on one or more of the following: an NLP model, the tokens, the one or more determined sentences, and the determined language of the query. The entity may be referred to as the subject or actionable object of the intent. For example, with reference to intent "[o]btener el estado" as shown in section 620, the entity may refer to the component that the user wishes to obtain its health information. In one embodiment, the method may use a set of rules based on the training corpus or a subset thereof to determine the entities associated with the intent of the user. The list of possible entities may be determined by identifying noun or pronoun word/tokens in proximity to the identified intent or its synonym in the query.

If the query has been tokenized, then the method may analyze the tokens in the order that they appear in the query. Otherwise, the method may tokenize the query as part of the analysis. Analysis of each of the words/tokens in the query in parallel will fall within the scope of the current disclosure. The method may analyze the words/tokens in the query until a noun or pronoun is identified. With reference to an example query in section 615, the natural language processing platform may analyze the query "Quiero comprobar el estado del servidor" to identify a noun element for an endpoint. Int this example, the method may determine that "[q]uiero", "el", and "del" are noise words and thus may be skipped while the word "servidor" may be a noun. The method may also determine other information relevant to the entity such as a type of the entity and a probability score as shown in section 625 of FIG. 6. The method proceeds to block 530.

At block 530, determines one or more actions mapped to the determined intent. The action may include an interface, a library associated with a function and the function. A component of the NLP system such as an action manager may be used to perform block 530. The method may use various techniques in determining the action that is bound or mapped to the intent. If an API training corpus has been tokenized, then the method may analyze the API tokens based on the intent and tokens of the API function calls. Otherwise, the method may tokenize the API function calls as part of the analysis.

The method may first identify an interface associated with the action. For example, based on the entity, the method may identify whether a possible API function call may be included with Redfish or WSMan. After identifying the interface, the method may identify a corresponding library of the interface. The method may then search the corresponding library to identify a match between words/tokens of the API and the intent. The APIs may be categorized or grouped accordingly such as alphabetically in the library. In another embodiment, the method may use a natural language pre-classification process in order to detect an action mapped to the intent. Even though the query is provided in different language formats, the query will result in the same action or API performed by the endpoint. After determining the API that is mapped to the intent, the method proceeds to block 535.

At block 535, the method generates a code or a script that includes the API function call. A component of the NLP system such as an action manager may be used to perform block 535. Prior to generating the script, the method may retrieve a schema associated with the API function call. The method may then parse the schema into elements and use the elements in generating the script and determining from the query values for a parameter if any in the schema. The method may also determine other information such as a uniform resource locator for the API, an identifier of the component or application endpoint, a username and password of the user, etc. After generating the script, the method may proceed to block 540.

At block 540, the method performs generated code and transmits an API request to an endpoint via an enterprise support structure. A component of the NLP system such as an action manager may be used to perform block 540. After transmitting the API request, the method ends.

Figures 6, 7:
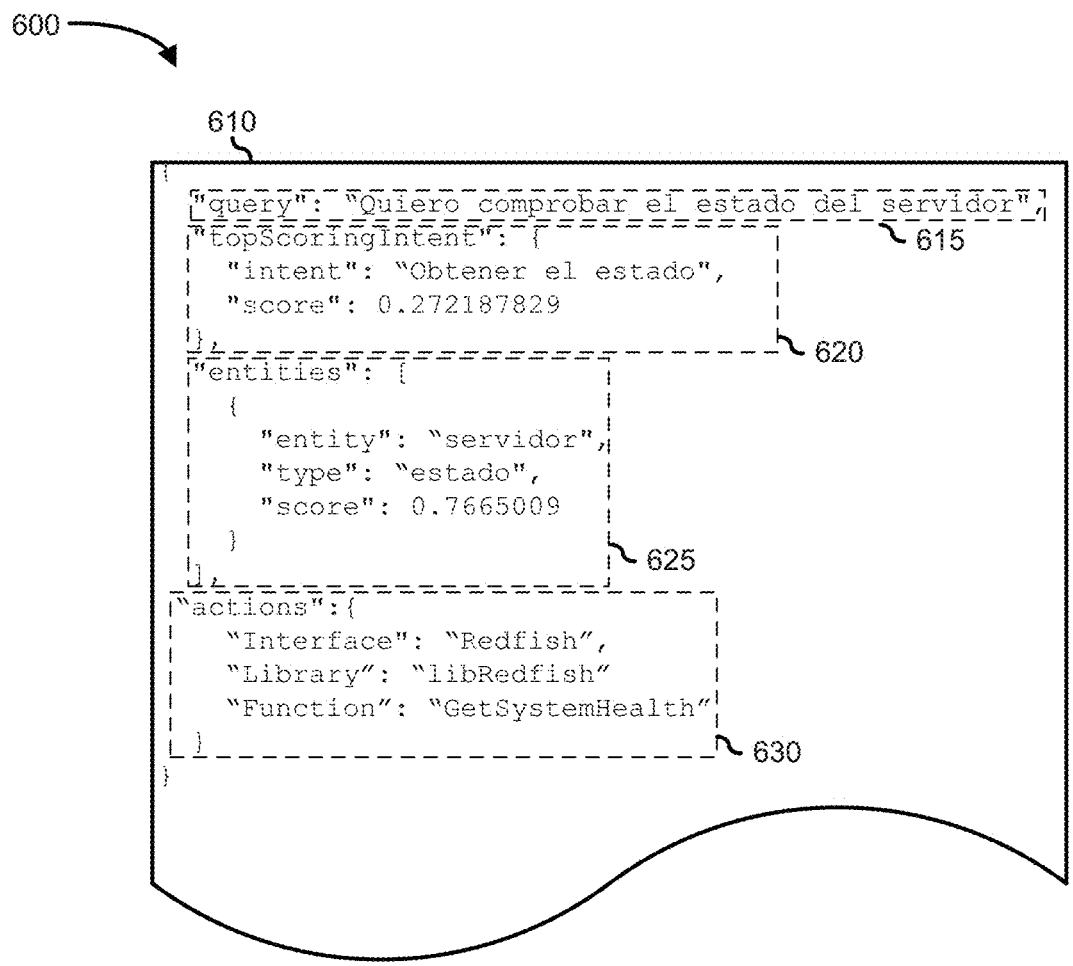
FIG. 6 is a diagram of a portion of an exemplary result that shows the intent and action binding, according to at least one embodiment of the present disclosure.
FIG. 7 is a diagram of a portion of an exemplary generated code that shows an application programming interface request, according to at least one embodiment of the present disclosure.

FIG. 6 shows a diagram of a portion of an exemplary result 610 in JSON data format. In another embodiment, result 610 may be in a different data format such as extensible markup language (XML) data format, comma-separated values (CSV) data format, etc. Result 610 includes sections 615, 620, 625, and 630. Section 615 shows a query converted to text from an audio utterance in Spanish. Section 620 shows a top scoring intent determined from the query. Section 625 shows an entity associated with the intent. Section 630 shows an action associated with the intent.

FIG. 7 shows a diagram of a portion of an exemplary code 700 generated based on result 610. A shown the exemplary code 700 is in python and calls a function to retrieve and output the health status of a system.

When referred to as a "device," a "module," or the like, the embodiments described herein can be configured as hardware. For example, a portion of an information handling system device may be a hardware such as, for example, an integrated circuit (such as an application-specific integration circuit (ASIC), a field-programmable gate array (FPGA), a structured ASIC, or a device embedded on a larger chip), a card (such as a peripheral component interface (PCI) card, a PCI-express card, a personal computer memory card international association (PCMCIA) card, or other such expansion card), or a system (such as a motherboard, a system-on-a-chip (SOC), or a stand-alone device).

In the flow diagrams of FIG. 3. and FIG. 5, each block represents one or more operation that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the system 300 and method 500 are described with reference to FIG. 1 or FIG. 2 as described above, although other models, frameworks, systems, and environments may implement these processes.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein. Also, the term "user" in this context and elsewhere herein is intended to be more broadly construed to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for determining an action based on a natural language query, the method comprising:
    receiving the natural language query, by a processor, wherein the natural language query is directed to a remote component, and wherein the natural language query is in a language other than English;
    selecting the language with a highest probability score from a set of languages, wherein each language of the set of languages is associated with a probability score;
    downloading a trained model binary file corresponding to the selected language, wherein the trained model binary file may be used to determine one or more sentences based on the selected language;
    determining an intent based on the one or more sentences of the natural language query, wherein the intent has a highest intent probability score from a set of intents that includes a synonym associated with at least one of the set of intents, and wherein each intent of the set of intents is associated with an intent probability score;

determining an entity associated with the intent of the natural language query, wherein the entity is based on identifying at least one of a noun or pronoun in proximity to the intent;

determining an action associated with the intent and the entity, wherein the action is a function from a library registry to be carried out by the remote component; and determining an application programming interface associated with the function from the library registry based on a match between at least one of the intent and the entity to a token of the application programming interface.

2. The method of claim 1, further comprising curating application programming interfaces according to an interface.

3. The method of claim 1, wherein the determining the intent of the natural language query is based on one or more sentences in the natural language query.

4. The method of claim 1, wherein the determining of the entity is based on a natural language model.

5. The method of claim 1, wherein the action includes a distributed management task force interface.

6. The method of claim 1, further comprising binding the intent of the natural language query to the action that includes associating the intent of the natural language query to the application programming interface.

7. The method of claim 1, wherein the function is an application programming interface request.

8. The method of claim 1, wherein the remote component is a baseboard management controller coupled to an information handling system.

9. The method of claim 1, further comprising:
retrieving an application programming interface schema from a repository;
parsing the application programming interface schema into elements; and
generating a code based on the elements, wherein the code includes an application programming interface request associated with the function to be performed at the remote component.

10. The method of claim 9, wherein the application programming interface request includes an internet protocol address of the remote component.

11. A natural language processing system comprising:
a model trainer operable to train a natural language processing model based on a training corpus, wherein the training corpus includes a data set from one of multiple languages;
an action manager operable to curate application programming interfaces according to an interface, wherein the interface includes a library registry; and
a processor operable to:
receive a natural language query at the natural language processing system, wherein the natural language query is directed to a remote component, wherein the natural language query is in a language other than English;
select the language with a highest probability score from a set of languages, wherein each language of the set of languages is associated with a probability score;
download a trained model binary file corresponding to the selected language, wherein the trained model binary file may be used to detect one or more sentences based on the selected language;
determine an intent based on the detected one or more sentences of the natural language query, wherein the intent has a highest intent probability score from a set of intents that includes a synonym associated with at least one of the set of intents, and wherein each intent of the set of intents is associated with an intent probability score;
determine an entity associated with the intent of the natural language query, wherein the entity is based on identification of at least one of a noun or pronoun in proximity to the intent;
determine an action associated with the intent and the entity, wherein the action is a function from the library registry to be carried out by the remote component; and
determine an application programming interface associated with the function from the library registry based on a match between at least one of the intent and the entity to a token of the application programming interface.

12. The natural language processing system of claim 11, wherein the natural language processing system is a multi-language natural language processing system.

13. The natural language processing system of claim 11, wherein the processor is further configured to segment the natural language query into tokens.

14. The natural language processing system of claim 11, wherein the library registry hosts a collection of curated application programming interfaces.

15. The natural language processing system of claim 11, wherein determining the intent of the natural language query is based on one or more sentences in the natural language query.

16. A non-transitory computer-readable medium including code that when executed causes a processor to perform a method, the method comprising:
receiving a natural language query directed to a remote component, wherein the natural language query is in a language other than English;
selecting the language with a highest probability score from a set of languages, wherein each language of the set of languages is associated with a probability score;
downloading a trained model binary file corresponding to the selected language, wherein the trained model binary file may be used to detect one or more sentences based on the selected language;
determining an intent based on the detected one or more sentences of the natural language query, wherein the intent has a highest intent probability score from a set of intents that includes a synonym associated with at least one of the set of intents, and wherein each intent of the set of intents is associated with an intent probability score;
determining an entity associated with the intent of the natural language query, wherein the entity is based on identifying at least one of a noun or pronoun in proximity to the intent;
determining an action associated with the intent and the entity, wherein the action is a function from a library registry to be carried out by the remote component; and
determining an application programming interface associated with the function from the library registry based on a match between at least one of the intent and the entity to a token of the application programming interface.

17. The non-transitory computer-readable medium of claim 16, wherein the method further comprising curating application programming interfaces according to an interface.

18. The non-transitory computer-readable medium of claim 16, wherein the library registry hosts curated application programming interfaces from one or more interfaces.

19. The non-transitory computer-readable medium of claim 16, wherein the method further comprising:
- retrieving an application programming interface schema from a repository;
- parsing the application programming interface schema into elements; and
- generating the code based on the elements, wherein the code includes an application programming interface request associated with the function to be performed at the remote component.

20. The non-transitory computer-readable medium of claim 16, wherein the method further comprising training a natural language processing model on a particular training corpus for the language of the natural language query.

* * * * *